United States Patent [19]

Honjo

[11] 4,218,595
[45] Aug. 19, 1980

[54] COMPOSITE SWITCH DEVICE MOUNTED TO THE STEERING SHAFT OF AUTOMOBILES

[75] Inventor: Kazumi Honjo, Tokyo, Japan

[73] Assignee: Niles Parts Co., Ltd., Japan

[21] Appl. No.: 870,802

[22] Filed: Jan. 19, 1978

[30] Foreign Application Priority Data

Feb. 18, 1977 [JP] Japan ................................ 52-18582

[51] Int. Cl.² ............................................. H01H 9/00
[52] U.S. Cl. .................................................. 200/61.54
[58] Field of Search ................ 200/61.27, 61.3, 61.34, 200/61.35, 61.54, 283, 284, 245–247, 153 LA, 4

[56] References Cited

U.S. PATENT DOCUMENTS

| | | | |
|---|---|---|---|
| 2,571,054 | 10/1951 | Newman | 200/284 X |
| 2,795,677 | 6/1957 | Slater | 200/284 |
| 3,510,839 | 5/1970 | Elliott et al. | 200/4 X |
| 3,530,266 | 9/1970 | Vitaloni | 200/61.27 X |
| 3,604,975 | 9/1971 | Suzuki et al. | 200/61.54 X |
| 3,790,726 | 2/1974 | Brown | 200/284 X |
| 3,842,231 | 10/1974 | Schedele et al. | 200/283 |
| 3,858,176 | 12/1974 | Miller et al. | 200/61.27 X |
| 3,873,788 | 3/1975 | Machalitzky et al. | 200/61.27 |
| 3,940,579 | 2/1976 | Buhl et al. | 200/4 |

Primary Examiner—James R. Scott
Attorney, Agent, or Firm—Lane, Aitken & Ziems

[57] ABSTRACT

A composite switch device mounted to the steering shaft of an automobile and integrally provided with several switches such as a turn indication switch, a lighting switch, and a wiper and washer switch, wherein one end of each contact plate in each of the switches is folded to form a rectangular portion used as a terminal to be directly connected to a coupler connected to an electric power source, without using complex lead wires and crimpers.

4 Claims, 3 Drawing Figures

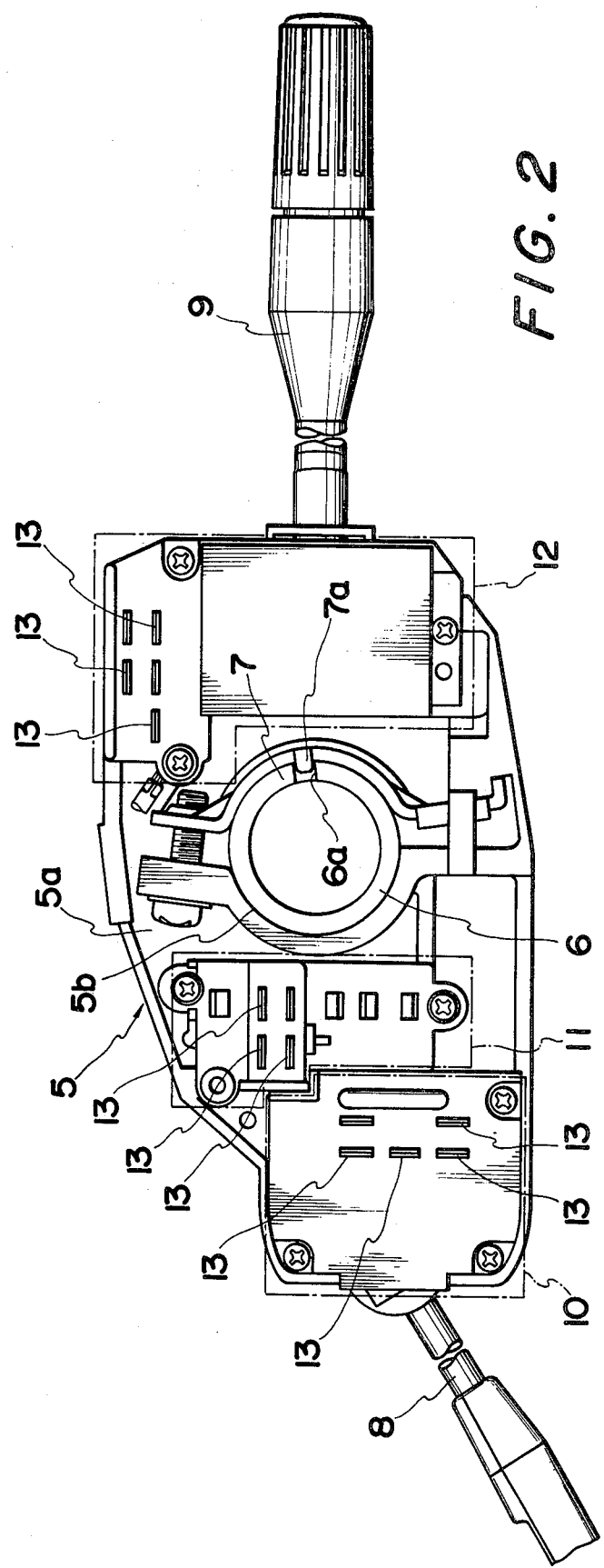

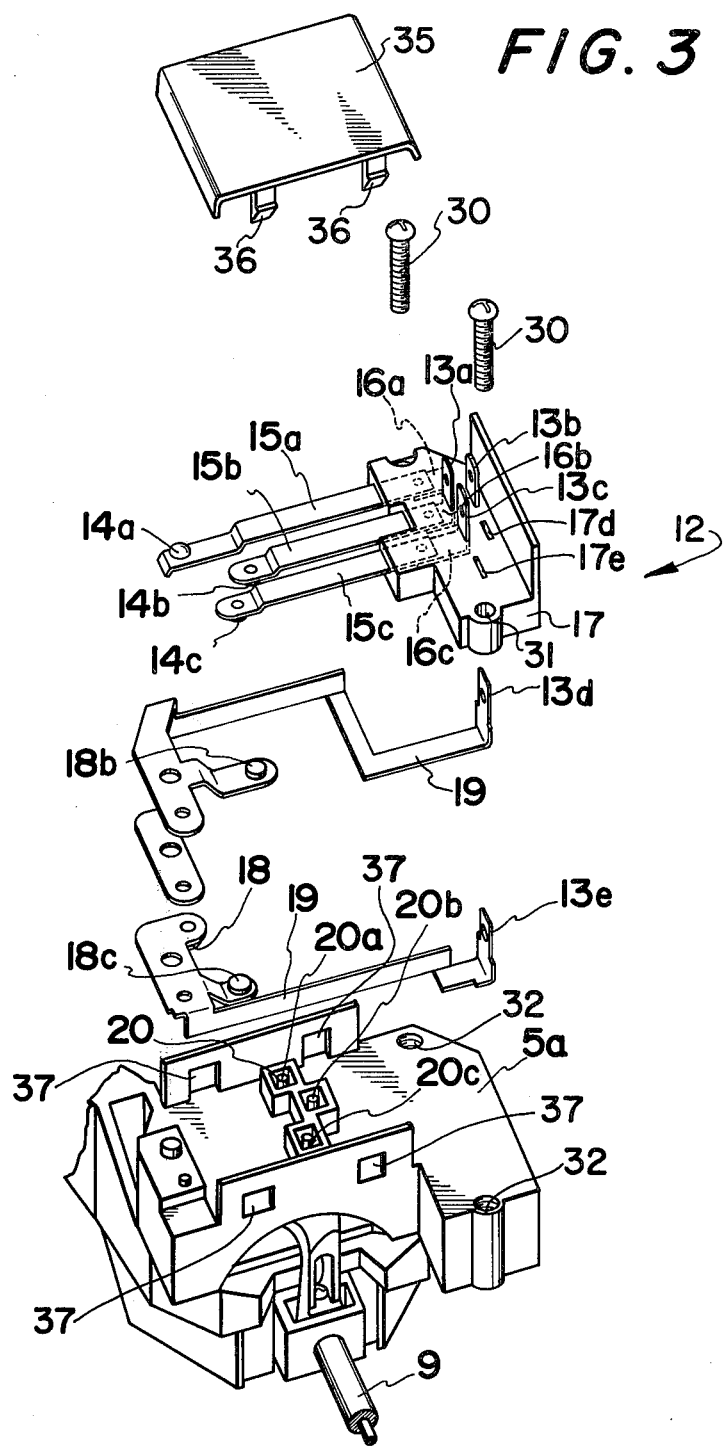

COMPOSITE SWITCH DEVICE MOUNTED TO THE STEERING SHAFT OF AUTOMOBILES

BACKGROUND OF THE INVENTION

1. FIELD OF THE INVENTION

This invention relates to a composite switch device mountable to the steering shaft or column of automobiles, and more especially to a connecting terminal for the composite switch device.

2. DESCRIPTION OF THE PRIOR ART

Recently, in view of advances in human engineering to make simple a driver's handling of operational switches in an automobile, a single composite switch integrally composing a turn indication switch, a lighting switch, a wiper switch and a washer switch is usually mounted to a steering shaft or column of an automobile, eliminating the need for providing each of switches mentioned above independently to the steering shaft or column of the automobile. However, the mounting of such switches to the steering shaft has thus been made quite complex.

Referring to a conventional composite switch as shown in FIG. 1, a coupler 1 is shown adapted to be connected to a mating coupler connected to an electric power source (not shown). Lead wires for connecting the terminals between the coupler 1 and each of a plurality of switches 2 such as a turn indication switch, lighting switches, a wiper switch and a washer switch.

In such a conventional construction, the lead wires 3 and crimpers 4 for crimping or enveloping many of the lead wires 3 are inevitably necessary. Further, the number of lead wires 3 is increased in accordance with the number of the switches 2 thereby increasing the chance that errors will be introduced into the wiring of the lead wires 3.

SUMMARY OF THE INVENTION

The object of the present invention is to provide a compact composite switch device in which each of the contact plates of each switch such as a turn indication switch, lighting switch, a wiper switch and a washer switch has a rectangular terminal structurally adapted for being connected to a coupler connected to an electric power source, without using any lead wires and crimplers.

BRIEF DESCRIPTION OF THE DRAWINGS

FIG. 2 is a bottom view of the composite switch device of the invention.

FIG. 3 is an enlarged detail showing a lighting switch.

DESCRIPTION OF THE PREFERRED EMBODIMENTS

Figure 1:
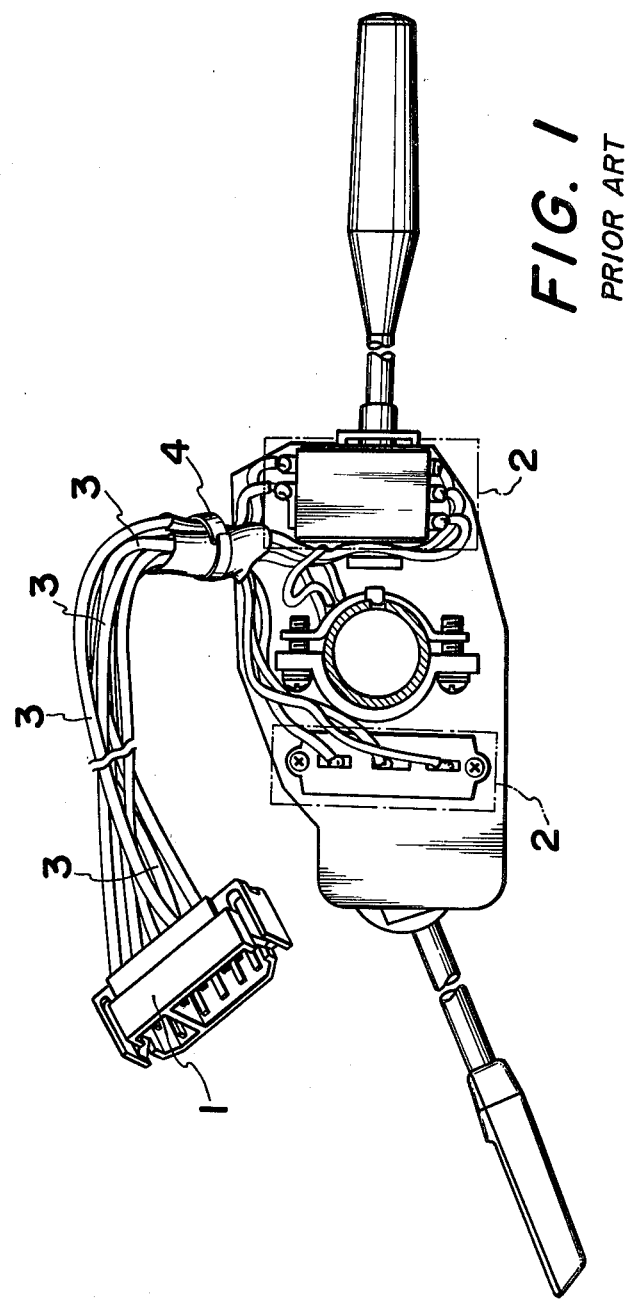
FIG. 1 shows a conventional composite switch device.

Referring now to an embodiment of the present invention shown in FIG. 2, the reference numeral 5 designates a composite switch device comprising a body 5a on which many switches 2 may be mounted. In the body 5a, there is provided an opening 5b for receiving a steering shaft (not shown) with a tube 6, and a fastening band 7 for fastening the steering shaft with the tube 6 in order to fix the body 5a to the steering shaft. On the band 7, there is provided a projection 7a to be connected to an opening 6a provided on the tube 6 in order to obtain a correct position of the body 5a relative to the steering shaft. On the body 5a of the composite switch device, there is integrally provided a wiper and washer switch 10 respectively operated by an up-down motion and a twist motion of a handle 8, a turn indication switch 11, and a lighting switch 12 operated by an up-down motion and a forward-backward motion of a handle 9. Each of the switches 10, 11 and 12 has several contacts and several contact plates. Each of the contact plates has such a portion that one end of the contact plate is folded in a rectangular formation used as a terminal 13 so that the rectangular terminal 13 can be easily connected to a coupler for an electric power source.

Referring to FIG. 3, the construction of the lighting switch 12 is shown in detail. The switch 12 includes a plurality of contact plates 15a, 15b, and 15c, each having a respective movable contact point 14a, 14b, and 14c at one end thereof. The other end of each respective contact plate 15a, 15b, or 15c is respectively electrically connected with a conductive plate 16a, 16b, and 16c. One end of each of the conductive plates 16a, 16b, or 16c, respectively designated by the reference numerals 13a, 13b, and 13c, is folded in a rectangular formation so that the end 13a, 13b, or 13c can be effectively utilized as a terminal connected to the coupler of the electric power source.

The connecting portion between each of the conductive plates 16a, 16b, or 16c and the other end of each of the contact plates 15a, 15b, and 15c is integrally molded in a fixed position by a terminal supporter 17 made of a suitable insulating material, such as plastic. The terminal supporter 17 defines a plurality of openings 17a–17e for receiving therein the upturned rectangular portion of the conductive plates as previously described and other portions which shall be discussed. In combination, each rectangular terminal projects from a surface of the terminal supporter 17 through an opening 17a–17e.

A contact plate 19a has a fixed contact point 18b at one end thereof which is contactable with the contact point 14b on the contact plate 15b. The other end of the plate 19a is folded to form the rectangular terminal 13d. Similarly, a second contact plate 19b has fixed contact points 18a and 18c at one end thereof which are contactable with the contact points 14a and 14c on the contact plates 15a and 15c, respectively. The other end of the plate 19b is folded to form the rectangular terminal 13e. As shown, the contact plates 19a and 19b are also supported by the terminal supporter 17. The above-identified construction comprising the contact plates 19a and 19b and the terminal supporter 17 is fixed to the body 5a (FIG. 2).

A plurality of movable pins 20a–20c are movable in the body 5a in the upward and downward directions in accordance with the up-down motion and the forward-backward motion of the switch handle 9.

The contact plates 15a, 15b, and 15c having the movable contact points 14a, 14b, and 14c are moved by the end points 20a, 20b and 20c of the pins 20 in accordance with the upward and downward motion of the pins 20. By this cooperation of elements, the movable contact points 14b and 14c can be contacted by the corresponding fixed contact points 18b and 18c in response to the operating position of the handle 9. The fixed contact point 18a is not shown in FIG. 3, but is able to make contact with the contact point 14a in the same manner described.

The assembly is retained by the use of a plurality of screws 30 which pass through openings 31 in the terminal supporter 17 and are threaded in threaded openings 32 in the body 5a. A retainer plate 35 is snap-fitted over the components of the switch assembly as described by snap elements 36 having laterally extending portions which mate with recesses 37 in the body 5a.

The constructions of the wiper and washer switch 10 and the turn indication switch 11 are similarly formed as that of the lighting switch 12 disclosed above, and the wiper and washer switch 10 and the turn indication switch 11 can be actuated by the similar connection between a similar rectangular terminal and a similar coupler for electric power source (not shown).

As mentioned above the composite switch device of the present invention has technical advantages that complex lead wires and crimpers are unnecessary thereby to avoid a miswiring of the complex lead wire and to provide a compact composite switch, which results from the provision of the rectangular terminal on the contact plate for directly connecting with the contact of the switch to the electric power source through the coupler for the electric power source.

I claim:

1. A composite switch device structurally adapted to be mounted to the steering shaft of an automobile and integrally providing a turn indication switch, a lighting switch, and a wiper and washer switch, comprising:

a switch body on which said switches are mounted;

a terminal supporter connecting to said switch body and defining a plurality of terminal-receiving openings in said terminal supporter;

at least one of said switches being structurally formed to define a rectangular terminal received in one of said terminal receiving openings on said terminal supporter and extending therefrom to receive an electrical coupler, said rectangular terminal provided at one end of a flexible, elongated contact plate of said switch, orthogonal to the remainder of said contact plate and adapted to be connected to said coupler connected to an electric power source; and a fixed contact point in said at least one switch, said contact plate being actuatable by a switch-actuating mechanism in said switch body to engage said fixed contact point.

2. The composite switch as set forth in claim 1 wherein a plurality of rectangular terminals from a plurality of said switches are formed by folding one end of a plurality of said contact plates orthogonally relative to the remaining portion of said contact plates.

3. The composite switch device according to claim 1 wherein said rectangular terminal comprises a separate conductive plate one end of which is folded orthogonally to a remaining portion of said plate and the other end of said conductive plate is electrically connected to one end of said elongated contact plate.

4. The composite switch as set forth in claim 4 wherein the switch-actuating mechanism comprises a plurality of reciprocating pins.

* * * * *